(12) United States Patent
Deforet et al.

(10) Patent No.: US 11,338,929 B2
(45) Date of Patent: May 24, 2022

(54) FORWARD ENGINE ATTACHMENT SYSTEM FOR AN AIRCRAFT ENGINE COMPRISING A DIRECT COUPLING BETWEEN THE JET ENGINE PYLON AND THE ENGINE

(71) Applicant: Airbus Operations (S.A.S.), Toulouse (FR)

(72) Inventors: Thomas Deforet, Toulouse (FR); Rémi Lansiaux, Toulouse (FR); Olivier Dubois, Toulouse (FR); Jacky Puech, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 170 days.

(21) Appl. No.: 16/878,346

(22) Filed: May 19, 2020

(65) Prior Publication Data

US 2020/0369395 A1 Nov. 26, 2020

(30) Foreign Application Priority Data

May 21, 2019 (FR) ...................................... 1905339

(51) Int. Cl.
*B64D 27/26* (2006.01)
*B64D 27/18* (2006.01)

(52) U.S. Cl.
CPC ............. *B64D 27/26* (2013.01); *B64D 27/18* (2013.01); *B64D 2027/266* (2013.01)

(58) Field of Classification Search
CPC ... B64D 27/26; B64D 27/18; B64D 2027/266
See application file for complete search history.

(56) References Cited

U.S. PATENT DOCUMENTS 6,474,597 B1 * 11/2002 Cazenave ............... B64D 27/18
244/54
6,682,015 B2 1/2004 Levert et al.
(Continued)

FOREIGN PATENT DOCUMENTS

EP 1 281 615 A1 2/2003
EP 2 436 601 A1 4/2012
(Continued)

OTHER PUBLICATIONS

French Search Report for Application No. 1905339 dated Jan. 28, 2020.

*Primary Examiner* — Richard R. Green
*Assistant Examiner* — Steven J Shur
(74) *Attorney, Agent, or Firm* — Jenkins, Wilson, Taylor & Hunt, PA

(57) ABSTRACT

A forward engine attachment system for an engine of an aircraft, the forward engine attachment system including a jet engine pylon including, in the region of the forward part thereof, a front part having an attachment wall, and a forward engine attachment with a connecting rod system on either side of a median plane, wherein each connecting rod system is fixed in articulated manner by at least one first link point to the attachment wall and is designed to be fixed in an articulated manner by at least one second link point to a forward part of the engine. Such a forward engine attachment system thus includes a direct coupling between the jet engine pylon and the engine, allowing the production of an assembly that is less heavy and is easier to produce.

4 Claims, 3 Drawing Sheets

(56) References Cited

U.S. PATENT DOCUMENTS

| | | | |
|---|---|---|---|
| 8,613,404 B2 | 12/2013 | Lafont et al. | |
| 9,238,510 B2 | 1/2016 | Brochard et al. | |
| 2014/0183298 A1* | 7/2014 | Brochard ............... | B64D 27/26 244/54 |
| 2019/0100324 A1 | 4/2019 | Journade et al. | |
| 2019/0135445 A1 | 5/2019 | Combes et al. | |

FOREIGN PATENT DOCUMENTS

| | | |
|---|---|---|
| EP | 2 754 612 A1 | 7/2014 |
| EP | 3 483 069 A1 | 5/2019 |
| EP | 3 750 811 B1 | 8/2021 |
| FR | 3 071 820 A1 | 4/2019 |
| WO | WO 93/11041 A1 | 6/1993 |

* cited by examiner

FORWARD ENGINE ATTACHMENT SYSTEM FOR AN AIRCRAFT ENGINE COMPRISING A DIRECT COUPLING BETWEEN THE JET ENGINE PYLON AND THE ENGINE

CROSS-REFERENCE TO RELATED APPLICATION

This application claims the benefit of and priority to French patent application number 19 05339 filed on May 21, 2019, the entire disclosure of which is incorporated by reference herein.

TECHNICAL FIELD

The disclosure herein relates to a forward engine attachment system for an aircraft engine and also to an aircraft comprising at least one such forward engine attachment.

BACKGROUND

An aircraft conventionally comprises at least one engine, in particular a turbojet. Under each wing and for each engine, the aircraft comprises a jet engine pylon that is fixed to the structure of the wing and extends below the wing and the engine is suspended under the jet engine pylon.

The engine is fixed to the jet engine pylon by an engine attachment system comprising a forward engine attachment and a rear engine attachment.

The forward engine attachment comprises, for example, a beam fixed to a forward face of the jet engine pylon and two connecting rods fixed between the beam and a forward casing of the engine. Each connecting rod is equipped with swivel joints constituted by two cut off, paired balls.

In combination, each connecting rod and the beam define a primary stress path between the engine and the jet engine pylon such as to withstand engine loads under the normal operating conditions of the engine.

Such a beam is a solid component obtained by machining a component obtained by forging. The method for obtaining this beam is relatively long and complicated.

Although such a beam is satisfactory from the standpoint of its use, there is a need to identify a different architecture with a view to facilitating the fabrication and implementation of the forward engine attachment system.

SUMMARY

An object of the disclosure herein is a forward engine attachment system comprising a direct coupling between the jet engine pylon and the engine.

To that end, a forward engine attachment system for an engine of an aircraft is proposed, the forward engine attachment system comprising:

a jet engine pylon comprising, in the region of the forward part thereof, a front part having an attachment wall, and
a forward engine attachment comprising a connecting rod system on either side of a median plane, wherein each connecting rod system is fixed in articulated manner by at least one first link point to the attachment wall and is designed to be fixed in an articulated manner by at least one second link point to a forward part of the engine, wherein each connecting rod system comprises a front connecting rod and a rear connecting rod, wherein each first link point between the attachment wall and a connecting rod system has the form of a clevis, wherein a wall of the clevis is constituted by the forward connecting rod of the connecting rod system, wherein another wall of the clevis is constituted by the rear connecting rod of the connecting rod system, wherein the attachment wall is arranged between the two connecting rods, and wherein a bar traverses a bore of each connecting rod and a bore of the attachment wall.

Such a forward engine attachment system thus no longer comprises beams which enables the assembly to be lighter in weight.

Advantageously, the attachment wall is mounted on the bar by a swivel link.

Advantageously the forward engine attachment system comprises, for each connecting rod system, a stand-by safety fixing point activated in the event of failure of a primary stress path and which creates an auxiliary stress path between the engine and the jet engine pylon, each standby safety fixing point is constituted by a clevis produced in the engine and a bar sleeved in bores of the clevis and which traverses a bore of the attachment wall, the diameter of which is greater than the diameter of the bar.

The subject matter herein also discloses an aircraft comprising a structure, an engine and a forward engine attachment system according to one of the preceding variants, wherein the jet engine pylon is fixed to the structure, and wherein a forward part of the engine is fixed to the at least one second link point.

BRIEF DESCRIPTION OF THE DRAWINGS

The above-mentioned features of the disclosure herein and also other features will become more clearly apparent on reading the following description of an exemplary embodiment, the description being given in relation to the appended drawings, in which.

DETAILED DESCRIPTION OF THE DRAWINGS

Figure 1:
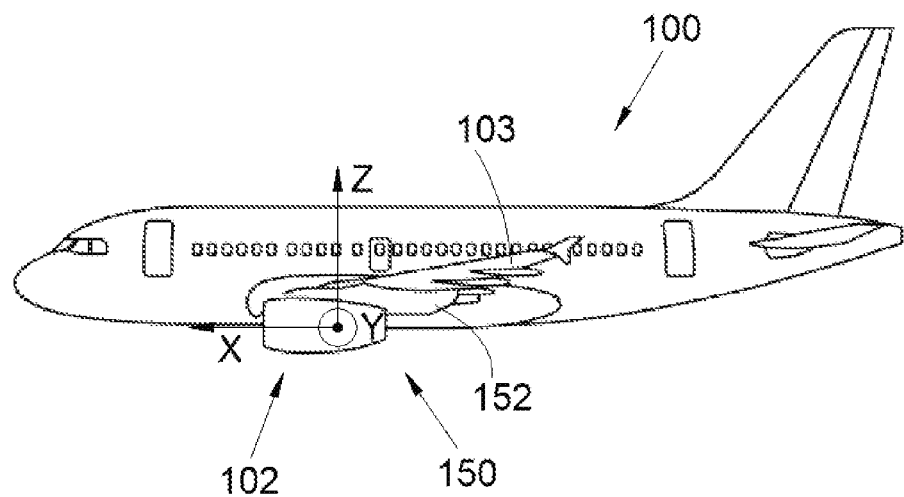
FIG. 1 is a side view of an aircraft according to the disclosure herein.

In the following description, terms relating to a position are considered with reference to an aircraft in the position of forward movement, i.e. as shown in FIG. 1.

FIG. 1 shows an aircraft 100 that has an engine 102, in particular a turbojet.

In the following description and by convention, X is the longitudinal direction of the engine 102 oriented positively in the direction of forward movement of the aircraft 100, Y is the transverse direction of the engine 102, which is horizontal when the aircraft is on the ground, and Z is the vertical direction or vertical height when the aircraft is on the ground, these three directions X, Y and Z being orthogonal relative to one another.

In the embodiment of the disclosure herein presented in FIG. 1, the aircraft 100 comprises an engine 102 under each wing 103, but it is possible to make provision for a plurality of engines under each wing 103.

Under each wing 103 and for each engine 102, the aircraft 100 has a forward engine attachment system 150 which is fixed to the structure of the wing 103 and extends under the wing 103 and supports the forward part of the engine 102.

Figure 2:
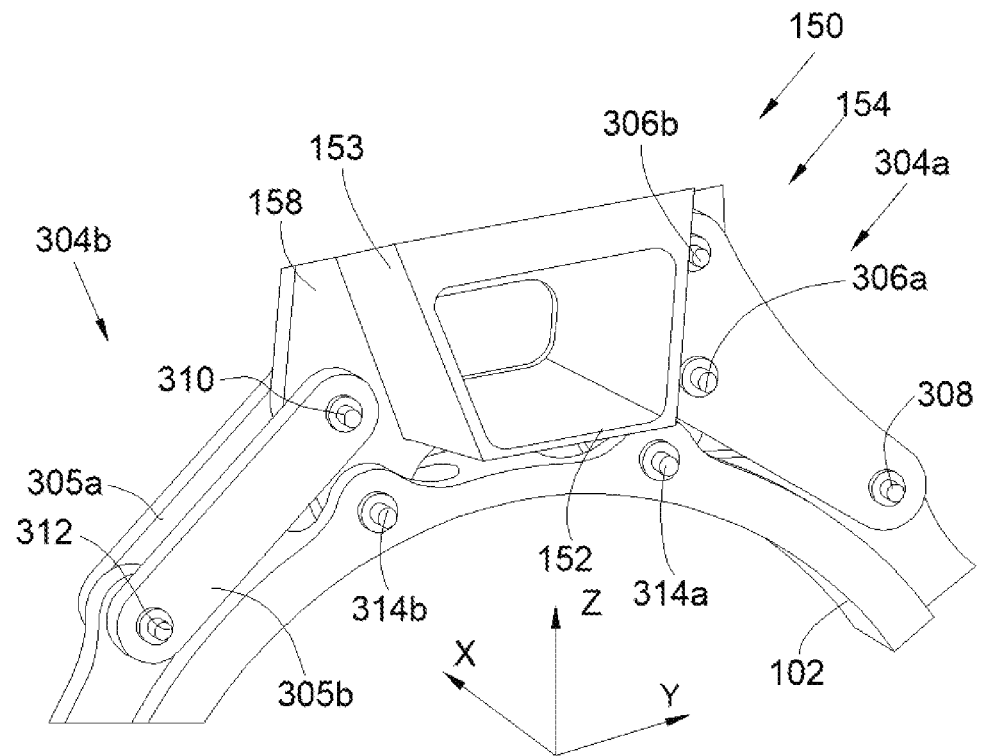
FIG. 2 is a perspective view of a forward engine attachment system according to the disclosure herein.
Figure 3:
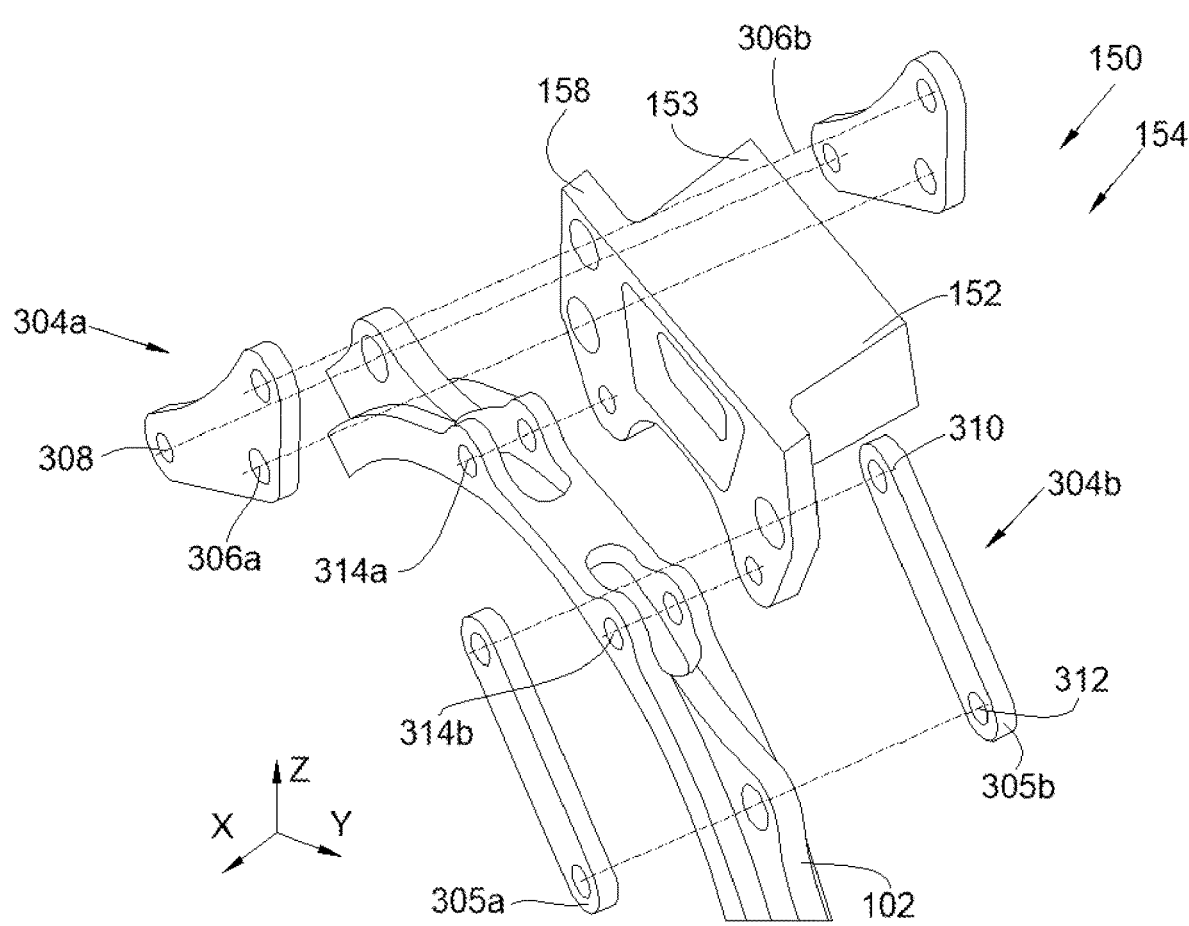
FIG. 3 is an expanded perspective view of the forward engine attachment system of FIG. 2.

As shown in FIGS. 2 and 3, the forward engine attachment system 150 comprises a jet engine pylon 152 fixed to the wing 103 and a forward engine attachment 154 fixed to the jet engine pylon 152 and to which the forward part of the engine 102 is fixed.

In a known manner, the jet engine pylon 152 has, for example, the form of a box comprising, inter alia, in the region of the forward part thereof, a front part 153 that extends in a substantially vertical plane.

The forward engine attachment 154 comprises a connecting rod system 304a-b on either side of a median plane XZ, wherein the connecting rods 305a-b are fixed directly between the jet engine pylon 152 and the engine 102.

In the embodiment of the disclosure herein presented here, the front part 153 has an attachment wall 158.

Unlike the prior art, the forward engine attachment 154 according to the disclosure herein comprises neither beam nor threaded fastening elements necessary for coupling the beam, which makes the forward engine attachment 154 lighter in weight and easier to implement. Such an installation furthermore makes it possible to improve clearances between the various elements.

Each connecting rod system 304a-b comprises a forward connecting rod 305a and a rear connecting rod 305b. The two connecting rods 305a-b are parallel to one another and the forward connecting rod 305a is arranged at the front relative to the rear connecting rod 305b in the longitudinal direction X.

Each connecting rod 305a-b lies in a plane globally parallel to the attachment wall 158.

Each connecting rod system 304a-b is fixed in an articulated manner by at least one first link point 306a-b, 310 to the attachment wall 158 and is fixed in an articulated manner by at least one second link point 308, 312 to a forward part of the engine 102, which is shown, here, in the form of a part of the forward casing thereof.

In the embodiment of the disclosure herein presented here, the first connecting rod system 304a is fixed by two first link points 306a-b to the attachment wall 158 and by a second link point 308 to the engine 102, and the second connecting rod system 304b is fixed by a first link point 310 to the attachment wall 158 and by a second link point 312 to the engine 102.

For each link point 306a-b, 310, 308, 312, the link between the connecting rod system 304a-b and the attachment wall 158 or, respectively, the engine 102 is achieved by a clevis, wherein each connecting rod 305a-b of the connecting rod system 304a-b constitutes a wall of the clevis, and wherein the attachment wall 158 or, respectively, the engine 102 is arranged between the two connecting rods 305a-b, wherein a bar traverses a bore of each connecting rod 305a-b and a bore of the attachment wall 158 or, respectively, the engine 102, wherein the attachment wall 158, or respectively, the engine 102 is mounted on the bar by a swivel link.

Figure 4:
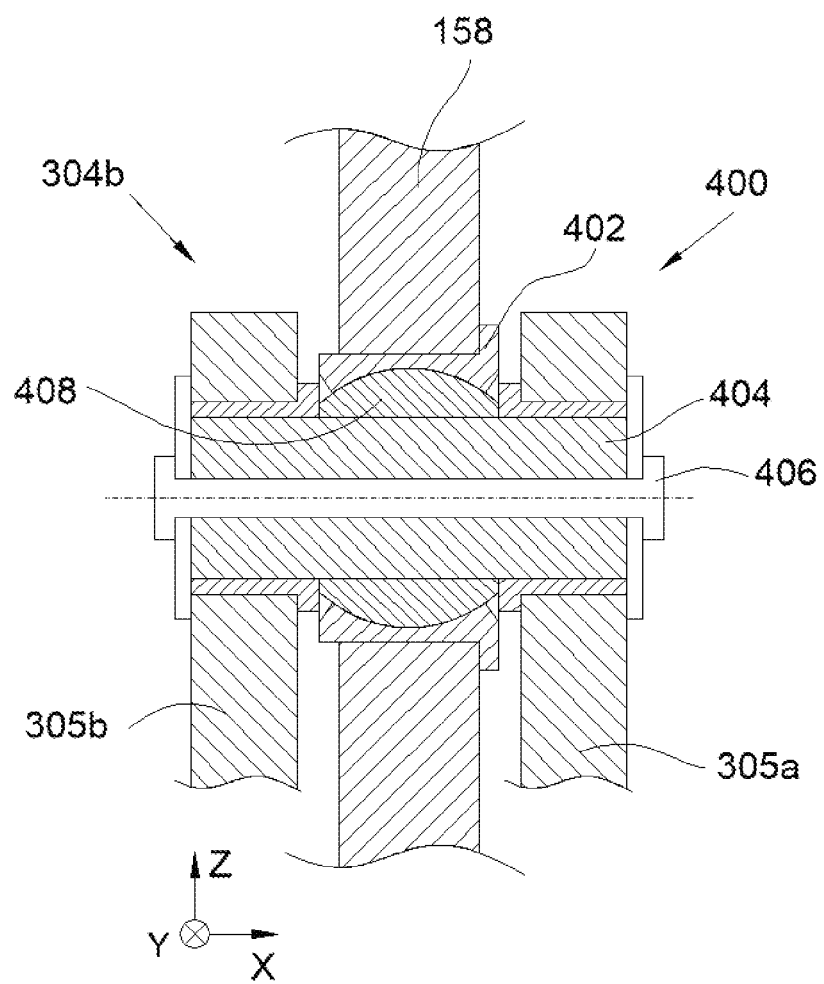
FIG. 4 is a sectional view of a swivel system in the region of a link point.

FIG. 4 shows a swivel system 400 in the region of the first link point 310 between the connecting rod system 304a-b and the attachment wall 158. The other link points may have the same form, in particular in the region of the engine 102.

The swivel system 400 comprises a cage 402 that is fixed, for example by screwing, inside the bore of the attachment wall 158 and the bar 404 that is sleeved and fixed in the bore of the attachment wall 158 and in the bores of the connecting rods 305a-b, in this case by bearings and a bolt 406 that sandwiches the connecting rods 305a-b, here, via washers.

The cage 402 has a spherical interior surface and the bar 404 carries a spherical central boss 408 about which the cage 402 is arranged. Thus, there is freedom of movement between the connecting rods 305a-b and the attachment wall 158, the attachment wall 158 and the cage 402 being able to pivot about the central portion 408.

Such an arrangement permits more robust behavior while protecting the housing against friction wear and ensures easier detachment in case of need.

Thus, in the embodiment of the disclosure herein presented here, each first link point 306a-b, 310 between the attachment wall 158 and a connecting rod system 304a-b has the form of a clevis, wherein a wall of the clevis is constituted by the forward connecting rod 305a of the connecting rod system 304a-b, wherein the other wall of the clevis is constituted by the rear connecting rod 305b of the connecting rod system 305a-b, wherein the attachment wall 158 is arranged between the two connecting rods 305a-b and wherein a bar traverses a bore of each connecting rod 305a-b and a bore of the attachment wall 158.

Similarly, in the embodiment of the disclosure herein presented here, each second link point 308, 312 between the engine 102 and a connecting rod system 304a-b has the form of a clevis, wherein a wall of the clevis is constituted by the forward connecting rod 305a of the connecting rod system 304a-b, wherein the other wall of the clevis is constituted by the rear connecting rod 305b of the connecting rod system 304a-b, wherein the engine 102 is arranged between the two connecting rods 305a-b, and wherein a bar traverses a bore of each connecting rod 305a-b and a bore of the engine 102.

In combination, each connecting rod system 304a-b, the attachment wall 158 and the front part 153 define a primary stress path between the engine 102 and the jet engine pylon 152 such as to withstand the loads of the engine 102 under the normal operating conditions of the engine 102.

For improved safety, the forward engine attachment system 150 comprises a supplementary link point 314a-b for each connecting rod system 304a-b. The supplementary link points 314a-b are arranged on either side of the median plane XZ, and each one provides a supplementary link between the forward engine attachment system 150 and the engine 102. Each supplementary link point 314a-b has the form of a standby safety coupling point (or "waiting failsafe"), which will compensate for a failure in the primary stress path, i.e. of at least one of the connecting rods 305a-b. That is to say, when a component in the primary stress path is damaged activation of a standby safety coupling point creates an auxiliary stress path between the engine 102 and the jet engine pylon 152.

Each standby safety coupling point 314a-b is constituted, here, by a clevis produced in the engine 102 and a bar sleeved in bores of the clevis and which traverses a bore of the attachment wall 158, the diameter of which is greater than the diameter of the bar. Thus, during normal operation, there is no contact between the bar and the attachment wall 158 and, in the event of rupture of one of the connecting rods 304a-b, the engine 102 will move and the bar then comes into contact with the attachment wall 158.

For each of the clevises described above, the bar of the clevis is globally parallel to the longitudinal direction X.

The engine 102 is mounted by a vertical upward movement and the positioning of the horizontal clevis bars.

While at least one example embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A forward engine attachment system for an engine of an aircraft, the forward engine attachment system comprising:
    a jet engine pylon comprising, in a region of a forward part thereof, a front part having an attachment wall; and
    a forward engine attachment comprising:
        a first connecting rod system comprising:
            a front connecting rod;
            a rear connecting rod; and
            a standby safety coupling point configured for activation upon a failure of a primary stress path of the first connecting rod system;
        wherein the front and rear connecting rods are connected to, at one or more first link points, the attachment wall on opposite sides thereof in an articulated manner, in a form of a clevis at each of the one or more first link points;
        wherein the front and rear connecting rods are configured for connection to, at one or more second link points, a forward part of the engine in an articulated manner;
        wherein a first wall of each clevis is constituted by the forward connecting rod;
        wherein a second wall of each clevis is constituted by the rear connecting rod;
        wherein the attachment wall is positioned between the two connecting rods; and
        wherein a bar traverses, at each of the one or more first link points, a bore formed through each of the first connecting rod, the second connecting rod, and the attachment wall; and
    a second connecting rod system comprising:
        a front connecting rod;
        a rear connecting rod; and
        a standby safety coupling point configured for activation upon a failure of a primary stress path of the second connecting rod system;
    wherein the front and rear connecting rods are connected, at one or more first link points, to the attachment wall on opposite sides thereof in a form of a clevis;
    wherein the front and rear connecting rods are configured for connection to, at one or more second link points, a forward part of the engine in an articulated manner
    wherein a first wall of each clevis is constituted by the forward connecting rod;
    wherein a second wall of each clevis is constituted by the rear connecting rod;
    wherein the attachment wall is between the two connecting rods; and
    wherein a bar traverses, at each of the one or more first link points, a bore formed through each of the first connecting rod, the second connecting rod, and the attachment wall;
    wherein the first connecting rod system is on an opposite side of a median plane of the jet engine pylon from the second connecting rod system;
    wherein each standby safety coupling is configured, when activated, to create an auxiliary stress path between the engine and the jet engine pylon; and
    wherein each standby safety coupling point comprises a clevis produced in the engine and a bar, which is sleeved in bores of the clevis and traverses a bore of the attachment wall, a diameter of which is greater than a diameter of the bar.

2. The forward engine attachment system according to claim 1, wherein, at each of the one or more first link points, the attachment wall is mounted on the bar by a swivel link.

3. The forward engine attachment system according to claim 1, wherein the median plane extends in a vertical direction and in a longitudinal direction of the jet engine pylon.

4. An aircraft comprising:
    a structure;
    an engine; and
    a forward engine attachment system according to claim 1;
    wherein the jet engine pylon is fixed to the structure; and
    wherein a forward part of the engine is fixed to the one or more second link points of each of the first and second connecting rod systems.

* * * * *